Jan. 21, 1941. J. BIJUR 2,229,035
LUBRICATION
Original Filed Oct. 25, 1922
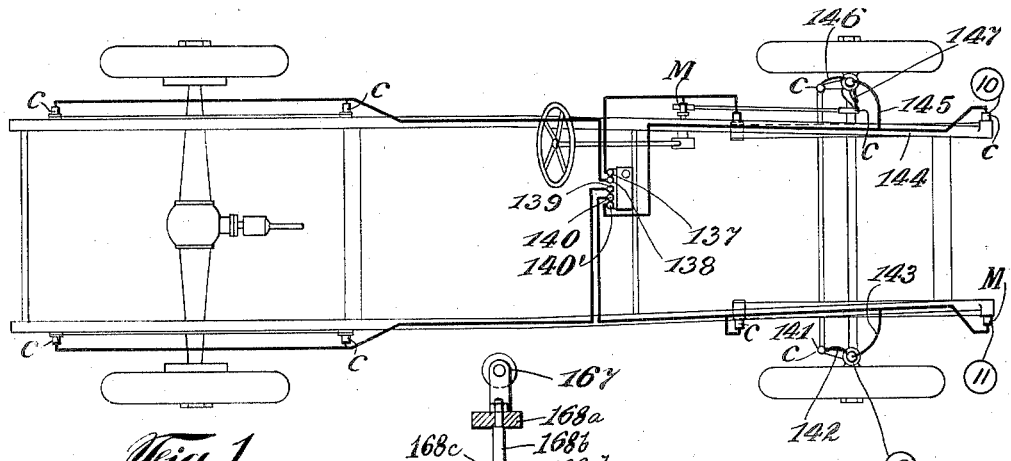
Fig. 1.
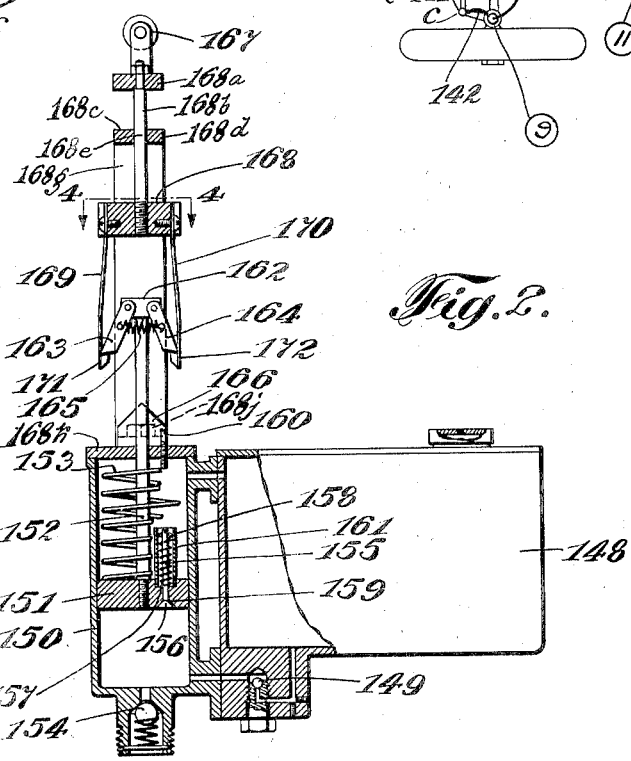
Fig. 2.
Fig. 4.
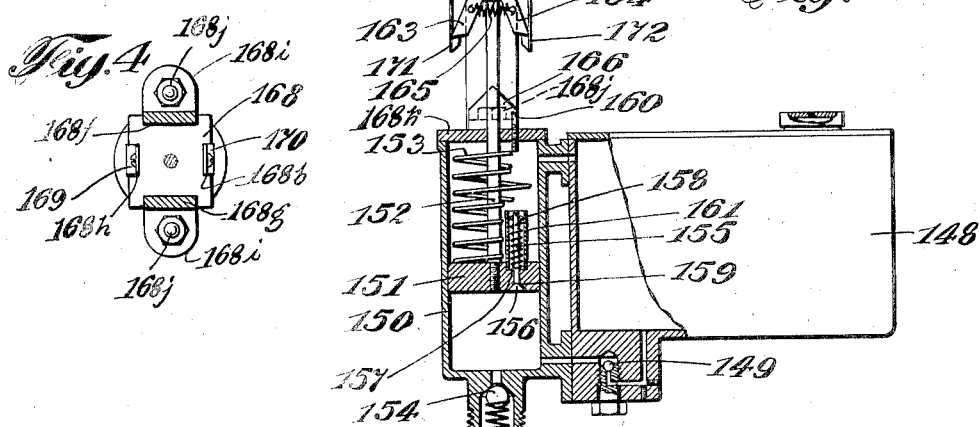
Fig. 3.
Inventor
Joseph Bijur, deceased,
by George Bijur, executor,
By Dean, Fairbanks, Obright & Hirsch.
his Attorneys Patented Jan. 21, 1941

2,229,035

UNITED STATES PATENT OFFICE 2,229,035

LUBRICATION

Joseph Bijur, deceased, late of New York, N. Y., by George Bijur, executor, New York, N. Y., assignor to Auto Research Corporation, a corporation of Delaware Original application October 25, 1922, Serial No. 596,856. Divided and this application October 22, 1935, Serial No. 46,079½

14 Claims. (Cl. 184—7)

The present invention relates to remote control lubrication and is concerned primarily with systems and installations, and the constituent elements thereof, for lubricating one or more bearings on a machine or group of machines, from a readily accessible point or points of control.

The invention has its preferred application to the lubrication of all or most of the bearings on the chassis of a vehicle, such as an automobile or motor truck although it may be applied to the apportioning of other liquids than lubricants to a plurality of devices on the same or different machines, other than an automobile.

An object is to provide a reliable lubricating installation, more particularly for motor vehicles, the use of which shall not require the exercise of any selective discretion, but in which following the simplest of manipulations, predetermined charges of lubricant may be distributed at a plurality of bearings, whether tight or loose, without excessive overflow.

Another object is to provide apparatus of the above type, the constituent parts of which shall be simple and durable in construction, easy to install, and unlikely to become out of order even after prolonged use.

The invention is primarily concerned with pressure lubricating systems, that is, with systems in which desired charges of oil are forced under pressure into the bearings.

It may be noted that where in a system of this type, oil is forced from a pump past a plurality of relief valves in parallel to corresponding bearings, unless the resistance to pressure of each line from the pump to a bearing, including the resistances of said bearing and of the relief valve in the line, is substantially uniform, lubricant is likely to be forced, first through the line of least resistance, so that pressure is relieved therethrough, and disproportionate charges of oil from the pump cylinder may be supplied to different bearings, some overflowing and others receiving too little oil.

By this invention, there is provided an arrangement for overcoming this objection. In one embodiment of the invention, a lubricant measuring device is provided preferably one for each bearing or group of bearings, to assure a supply thereto, upon operation, of the predetermined measured quantity of lubricant.

To assure the regular functioning of the lubricant measuring elements, it is preferred to maintain the lubricant lines from the pump to the bearings filled with oil at all times. This result is accomplished by the use of pressure-operated check valves.

The preferred embodiment of the invention is concerned with the type of centralized lubricating system in which the pump has a plurality of cylinders, each for supplying one or more associated bearings through a check valve by which the line or conduit is intended to be normally maintained filled.

If in such embodiment any of the lines should leak, due either to an imperfection in the length thereof, or in the seating of the relief valve, then the operator cannot tell after operating the succession of pumps, unless he specially inspects all of the bearings, whether or not some have been supplied with air from an empty line rather than with oil. In order to supply oil to those bearings fed by leaky lines, he will have to repeat the lubricating operation, wasting excess oil overflowing some of the bearings. Where the pump cylinders are concurrently discharged by a common operating handle, this second operation would involve substantial physical labor to force the added and wasted charge past the bearings, supplied from the previously filled lines.

According to the present embodiment, means is provided to assure with little manual effort, the supply of a complete and sufficient charge without excess, at each bearing even in case of a leaking line or relief valve. This result is achieved by providing means automatically indicating after operation of the pump cylinder, which lines require more oil, and providing means for the separate operation of the pump or pumps supplying such lines.

In one specific embodiment, a common operating member is provided by which all of the pump cylinders are manually charged, said operating member having releasable interlocking connections with the pumps.

Those cylinders that are connected to full lines will become discharged more slowly than those that control empty lines, automatic mechanical connections effecting disengagement between the lagging pump cylinders and the operating member, so that a repeated actuation of the operating member will only effect recharge of those cylinders that control empty lines.

In the accompanying drawing in which are shown some of various possible embodiments of the several features of the invention, Fig. 1 is a diagrammatic view of one form of chassis installation, Fig. 2 is a view of longitudinal cross-section of a preferred form of pump shown used in the installation of Fig. 1, Fig. 3 is a fragmentary front elevation of Fig. 2, and Fig. 4 is a detail sectional view taken along the line 4—4 of Fig. 2.

The chassis of Fig. 1 shows individual pipe lines extending to bearings or associated groups of bearings, each line fed from a separate and distinct cylinder of a multi-cylinder pump. The pumps are shown as manually actuated, but of course, may also be automatically actuated.

In Fig. 1, M designates measuring valves of the type shown in Fig. 6 of Bijur Patent No. 2,017,848 granted October 22, 1935, and C designates relief or check valves such as is shown in Fig. 7 of said patent.

In the layout illustratively shown, the extreme left pump cylinder 137 feeds the steering gear bearing through a measuring valve M.

Pump cylinders 138 and 139 feed each through two relief or check valves C, in parallel respectively, to the left and right rear springs, shackles and bolts.

Pump cylinder 140 feeds the rear shackle of the front spring at the right through relief or check valve C, and in parallel therewith, it feeds the front bolt through a fitting 11.

This line also feeds the right king pin through a flexible conduit 143 connected to a fitting 9, said fitting also supplying the tie rod joint 141 through a conduit 142.

The right-hand cylinder 140' feeds the left-hand front spring bolt through a conduit 144 provided with a fitting 10 connected to the bolt.

A flexible conduit 145 tapped from conduit 144 feeds the left-hand king pin, branches 146 and 147 respectively supplying the associated steering and third arm bearings through relief or check valves C.

In a multi-cylinder pump lubricating system in which the individual cylinders are hand-discharged, if the lines or any of them are not reliably maintained filled with oil, the operation of the pump may result in forcing air rather than oil through some of the bearings, and there would be no definite indication to the operator which of the pump cylinders should be again operated.

If all of the pump cylinders are operated, two or three times in succession, to assure sufficient lubrication of a bearing the line to which may have leaked, then other bearings will obviously receive an excess which will be lost by spilling on the floor or road.

In the present embodiment of the invention, there is provided means for automatically indicating, preferably during discharge, which cylinders are properly supplying the associated bearings, so that the operator can ascertain at a glance which pump units, if any, require a second operation to adequately supply the bearings connected thereto.

In the specific embodiment shown, in Figs. 2 to 4, a common operating member for all of the pump cylinders, becomes automatically disconnected in pump discharge from those cylinders supplying full pipe lines, while those cylinders, if any, connected to pipe lines from which oil may have leaked, remain operatively associated with the common operating member, so that in a second charging operation, only the latter cylinders will receive a second charge.

In the preferred specific embodiment, a reservoir 148 is connected through check valves 149 with the plurality of parallel cylinders, one of which is shown at 150. Within each cylinder is a piston head 151 attached to a vertical stem 152 urged downward by spring 153 to discharge the pump by forcing the oil past relief valve 154 in the pump outlet.

Through the piston extends the stem 155 of a small valve 156. A coil spring 157 encircles the valve stem and reacts against the piston head at one end and against a washer 158 on the stem, at the other, to urge valve 156 against its seat 159 in the bottom of the piston head. An adjustable screw stop 160 in the cylinder cap is in the path of the piston stem 155 to accurately fix the charge of the pump.

As long as valve 156 is closed, oil will be sucked into the cylinder in the charging or up-stroke, but when the stem 155 engages pin 160, valve 156 opens, so that no oil is sucked into the pump cylinder during the remainder of the pump-charging stroke. By appropriate setting of stop screws 160, the charge of each pump cylinder may be fixed at any desired volume, while the length of pump stroke remains constant.

Surrounding valve stem 155 and spring 157 is a tube 161 fastened tight to the top of the piston head, so that any oil which may find its way to the top of the piston head cannot pass the valve aperture into the space below the piston head and thus interfere with the accurate and uniform determination of the amount of oil, which the piston is set to deliver.

The apparatus for charging the pump comprises a head 162 mounted on the top of the piston stem, supporting two pawls 163 and 164 connected by spring 165 which tends to draw them toward each other. At the bottom of the pump stroke, the pawls are forced apart by a wedge 166 on the cylinder head.

A lifting handle 167 is attached to a common cross-strap 168a carrying the rods 168b. The rods 168b screw into the blocks 168 to the sides of which are fastened leaf springs 169 and 170 at the lower ends of which are lugs 171 and 172 to engage respectively the ends of the pawls 163 and 164, when these are stretched apart. When not so spread, the pawls are drawn inward by the connecting spring 165, and lugs 171 and 172 can pass up and down without coming into engagement with said pawls. The blocks 168 and rods 168b are guided by the inverted U-brackets 168c. These brackets 168c have top portions 168d bored at 168e to receive the rods 168b. The blocks 168 are recessed at 168f and by these recesses slide on the legs 168g of the brackets 168c. The blocks 168 are also recessed at 168h to receive the upper ends of the springs 169 and 170. The brackets are provided with the outstanding ears 168i which are bolted at 168j to the top 168k of the pump structure 150.

In the operation of this installation, the handle 167 is lifted all the way, carrying all pumps to the top of their stroke and drawing into each pump, such quantity of oil as has been determined by the setting of the adjustable stop. The handle is released and the cross-bar 168a drops by gravity, the pawls 163—164 are drawn together and the pump pistons descend.

If the line and bearings fed by the pumps are all tight, the pumps will descend quickly partially, and then settle slowly for the rest of their stroke, as oil is forced toward the bearings.

If the operating handle be again lifted, no pump cylinders will be elevated, since the pawls 163 and 164 are all out of the path of lugs 171 and 172, and the operator is aware that the oiling operation needs no further attention.

If, however, say one line has become partly or wholly emptied, as, for instance, through a leak either in the length thereof or at the relief valve, the pump feeding such line would encounter no appreciable resistance and would descend quickly through its entire stroke, the associated wedge 166 then spreading the pawls in said cylinder apart. The operating handle being now again lifted, lugs 171 and 172 will pass under these pawls 163 and 164 and will elevate the piston of only this particular pump to the top of its stroke.

Upon release of the operating handle, this pump would descend to supply the further charge of oil to the line requiring it. Thus, in the present embodiment, a proper and sufficient quantity of oil is supplied at each bearing by the simple expedient of raising the operating handle once and allowing it to descend, and raising it a second time, if any of the cylinders settle quickly.

There is no need for special inspection to ascertain which of the bearings, if any, require more oil after any operation of the pump.

The present application is a division of application, Serial No. 596,856, filed October 25, 1922, now Patent No. 2,017,848, issued October 22, 1935, and Figs. 1 to 4 hereof correspond respectively to original Figs. 8, 9, 10 and 11 of said parent application.

As many changes could be made in the above construction, and many apparently widely different embodiments of this invention could be devised without departing from the scope thereof, it is intended that all matter contained in the above description or shown in the accompanying drawing, shall be interpreted as illustrative and not in a limiting sense.

What is claimed is:

1. A multi-cylinder pump comprising a plurality of cylinders, pistons therein, a common operating member, means connecting said operating member to said pistons to charge them all concurrently, said pistons being charged simultaneously and discharging independently, and means to automatically disconnect any piston or pistons from the operating member, when said piston or pistons have supplied such a charge of lubricant as would completely fill the lines receiving the lubricant and prevent completion of the discharge of said piston or pistons, whereby a repeated stroke of the operating member will not be effective to recharge the cylinders with said last mentioned pistons, said piston or pistons being again connected to said operating member to be operated thereby when they have subsequently completed their discharge.

2. A pump having a plurality of cylinders, a piston in each cylinder, a common operating member adapted to engage the pistons when the latter are at an extremity of their stroke to charge the cylinders by the movement of said operating member, and means to automatically withdraw each piston which has not been completely discharged from the path of the actuating member, whereby the second operation of the actuating member will cause charging only of those pistons that are at the extremity of their stroke.

3. In a pressure lubricating system, in combination, bearings, a plurality of pump cylinders, conduits extending from the various pump cylinders to the bearings, each pump having a piston, a common operating member for concurrently charging all of said pump cylinders by a single operation, spring means in each of said pump cylinders for exerting pressure upon the piston to perform the operative stroke, and means to automatically disconnect a piston which has not completed its discharge from the operating member, said actuating connections being engaged when said discharge is subsequently completed whereby a repeated actuation of the common operating member will recharge only those pump cylinders that have encountered no substantial resistance in the line of flow, and whereby a repeated actuation of the common operating member will effect a repeated discharge to only those conduits that are not full.

4. In a lubricating installation for a plurality of bearings which are arranged in groups, a central reservoir, a plurality of pump structures fed from said reservoir, each feeding one of said group of bearings, means to actuate said pump structures, actuating connections between said actuating means and said pump structures and means to disengage said actuating connections when the respective pump structures have supplied such a charge of lubricant as would completely fill the portion of the installation receiving lubricant from said respective pumps and prevent completion of the discharge of said respective pump structures, said actuating connections being engaged when said discharge is subsequently completed.

5. A pump comprising a cylinder, a piston, a connecting rod connected to said piston and extending out of said cylinder, a latch element on said connecting rod, an actuator for actuating the piston to charged position carrying a cooperating latch element, a return spring for moving the piston to fully discharged position, and engaging means to cause said elements to engage when the piston has fully discharged.

6. A pump comprising a cylinder, a piston, a connecting rod connected to said piston and extending out of said cylinder, a latch element on said connecting rod, an actuator for causing the piston to take a charging stroke carrying a co-operating latch element, a return spring for causing the piston to take a discharging stroke, engaging means to cause said elements to engage when the piston has fully discharged, and disengaging means to prevent such engagement when the piston has not been fully discharged.

7. The pump of claim 6, said engaging means including a cam and said disengaging means including a spring.

8. In a pump construction, a cylinder, a reciprocating piston, means to actuate said piston, a relief in said piston and means to actuate said relief, said last-mentioned means being operative when said piston is adjacent the end of its charging stroke and is about to start its discharging stroke.

9. In a pump construction, a cylinder, a reciprocating piston, means to actuate said piston, a relief valve positioned in said piston and adjustable means to operate said valve at a predetermined position in the movement of the piston, said last-mentioned means being operative when said piston is adjacent the end of its charging stroke and is about to start its discharging stroke.

10. In a pump construction, a cylinder, a reciprocating piston, means to actuate said piston, a relief passage in said piston and means to open and shut said passage and thus control the discharge of said piston, said last-mentioned means being operative when said piston is adjacent the end of its charging stroke and is about to start its discharging stroke.

11. In a pump construction, a cylinder, a reciprocating piston, means to actuate said piston, a relief in said piston and means to actuate said relief, said means including a threaded member in the end of the cylinder to open said relief and thus control the discharge of said piston, said last-mentioned means being operative when said piston is adjacent the end of its charging stroke and is about to start its discharging stroke.

12. A multiple piston pump comprising a central lubricant reservoir, a plurality of cylinders, pistons in said cylinders, inlet means from said reservoir to said cylinders, reciprocatory charging means to move said pistons in charging the cylinders, discharging means to move said pistons to discharge said cylinders, and means to disconnect said charging means and said pistons, each said piston having an extension having a latch element, said last mentioned means having a cooperating latch element and means to prevent said latch elements from engaging each other when said piston has not completed its discharge stroke.

13. A piston pump comprising a central lubricant reservoir, a cylinder, a piston, inlet means from said reservoir to said cylinder, reciprocatory charging means to move said piston to charge said cylinder, discharging means to move said piston to discharge said cylinder, and means to disconnect said charging means and said piston, said piston being provided with means actuated at the limit of the charging stroke to limit the charge received by said cylinder.

14. A piston pump comprising a central lubricant reservoir, a cylinder, a piston, inlet means from said reservoir to said cylinder, reciprocatory charging means to move said piston to charge said cylinder, discharging means to move said piston to discharge said cylinder, and means to disconnect said charging means and said piston, said piston having a spring controlled latch device and said last mentioned means having a cooperating latch device to cooperate with said spring controlled latch device when said piston is completely discharged.

GEORGE BIJUR,
*Executor of the Estate of Joseph Bijur, Deceased.*